United States Patent [19]

Klein

[11] 4,045,990

[45] Sept. 6, 1977

[54] ENDLESS REINFORCEMENT

[75] Inventor: Norman E. Klein, Inman, S.C.

[73] Assignee: Milliken Research Corporation, Spartanburg, S.C.

[21] Appl. No.: 704,069

[22] Filed: July 9, 1976

Related U.S. Application Data

[62] Division of Ser. No. 432,162, Jan. 10, 1974, Pat. No. 4,002,789.

[51] Int. Cl.² ............................................. B21D 13/00
[52] U.S. Cl. ...................................... 72/190; 140/105
[58] Field of Search ............... 140/71 R, 90, 91, 105; 72/190, DIG. 16

[56] References Cited

U.S. PATENT DOCUMENTS

| 973,477 | 10/1910 | Cocker | 140/105 |
|---|---|---|---|
| 1,237,732 | 8/1917 | Wheeler | 72/190 |
| 2,169,420 | 8/1939 | Jacobs | 140/91 |
| 2,963,048 | 12/1960 | Smith | 140/105 |

Primary Examiner—Lowell A. Larson
Attorney, Agent, or Firm—Robert S. Alexander; H. William Petry

[57] ABSTRACT

An endless reinforcement comprising a unitary strip positioned across the width of the reinforcement from one side to the other at an angle to the edges of the reinforcement, the unitary strip including a multiplicity of continuous filaments surrounded and separated by rubber disposed in a contiguous undulating relationship throughout the length of the strip. Also, apparatus for forming a unitary strip including interdigitating gripper means arranged in an oval path, means for advancing the gripper means around the oval path, and means for increasing the degree of interdigitation of the gripper means during a portion of their advancement around the oval path.

14 Claims, 9 Drawing Figures

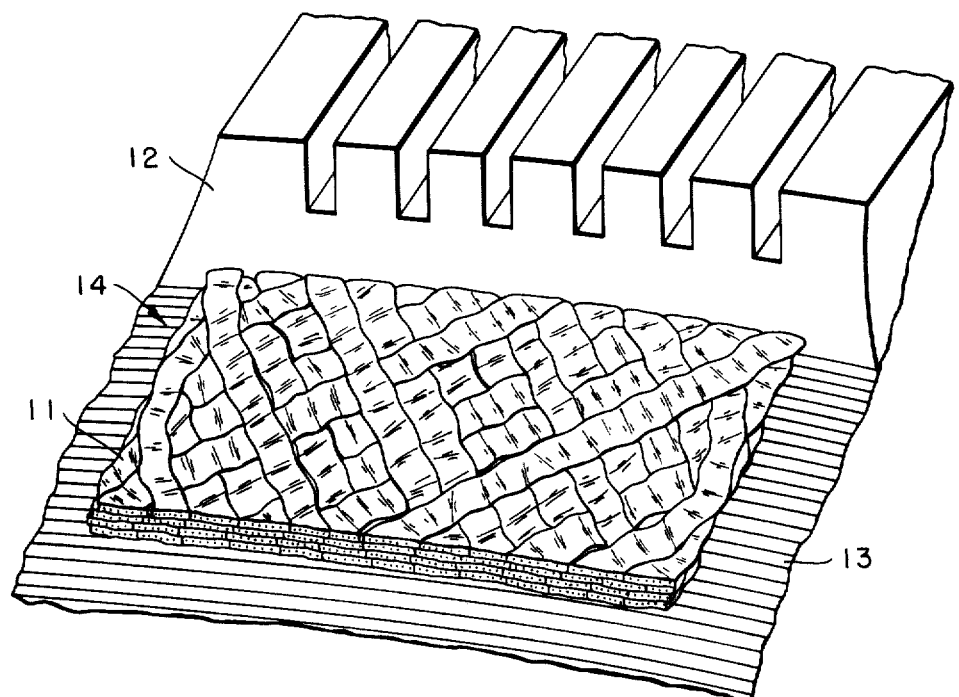
FIG.-1-
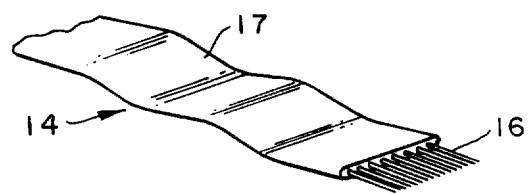
FIG.-2-

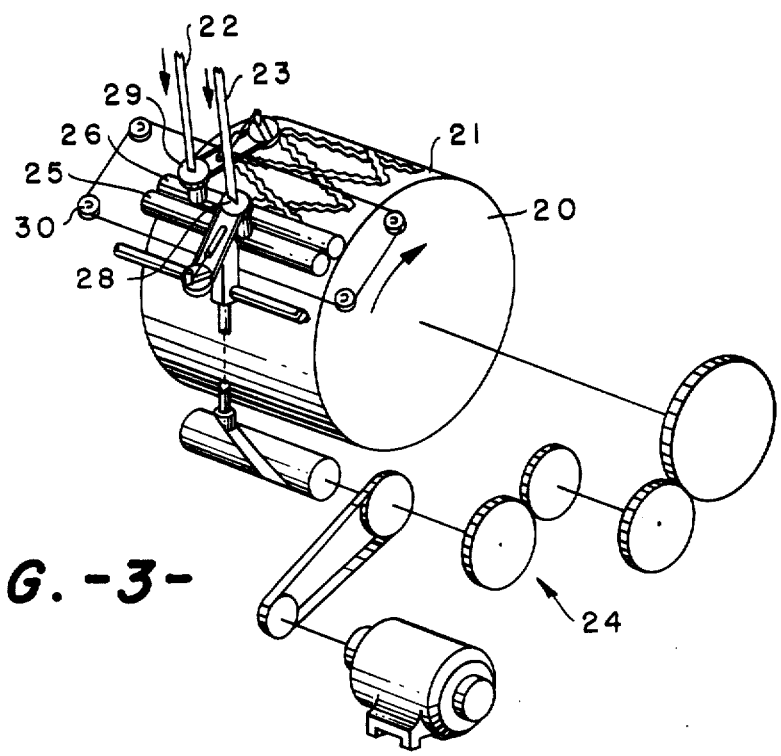
FIG.-3-
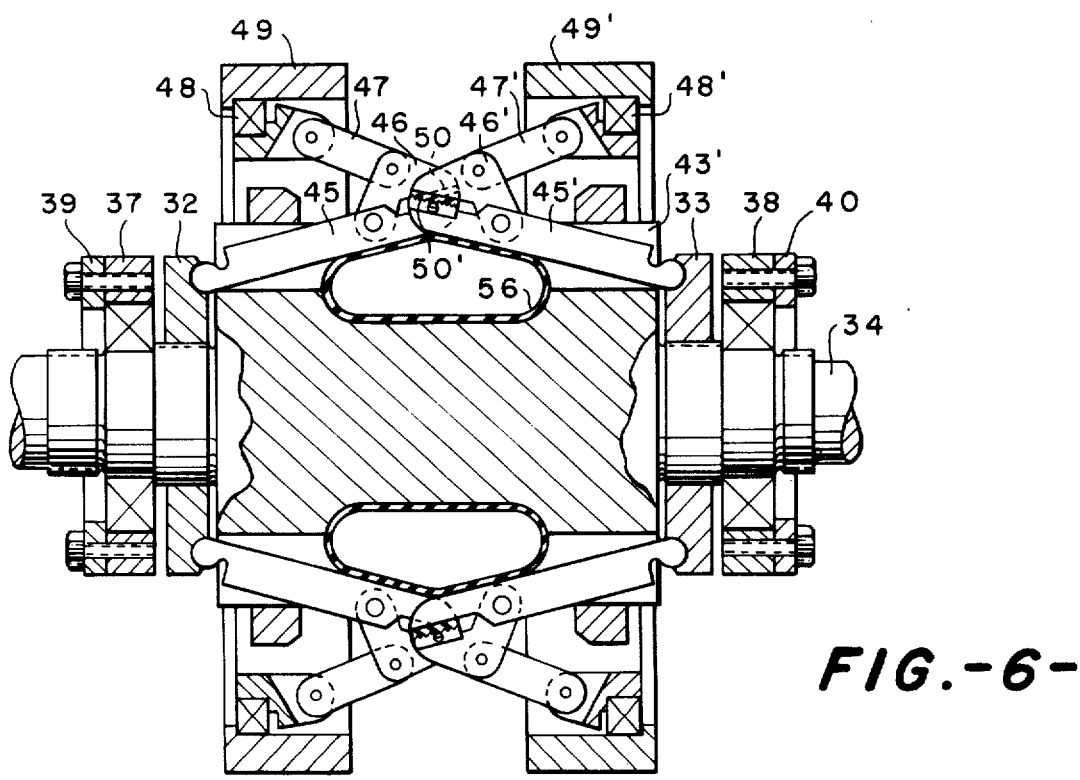
FIG.-6-

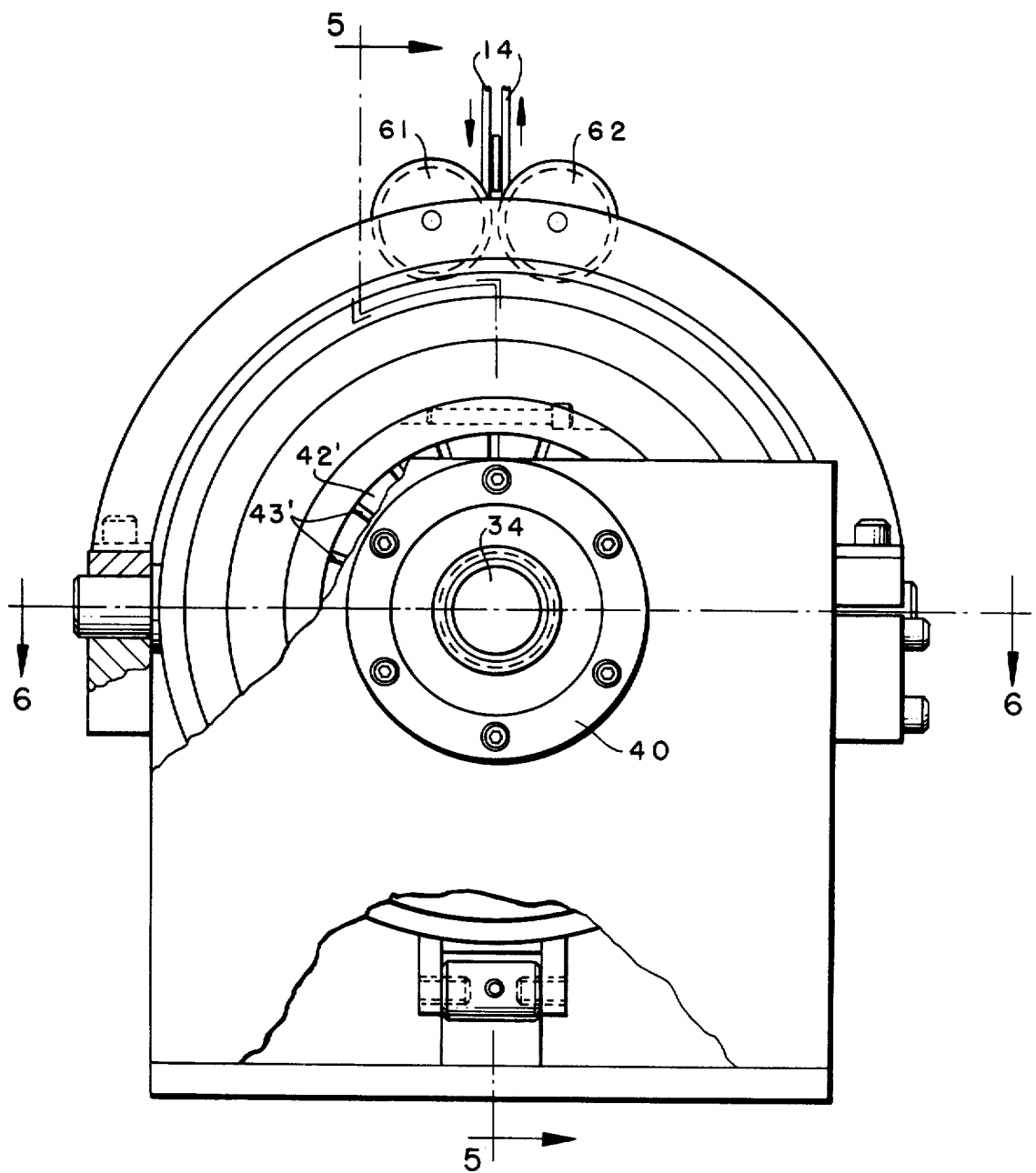
FIG. -4-

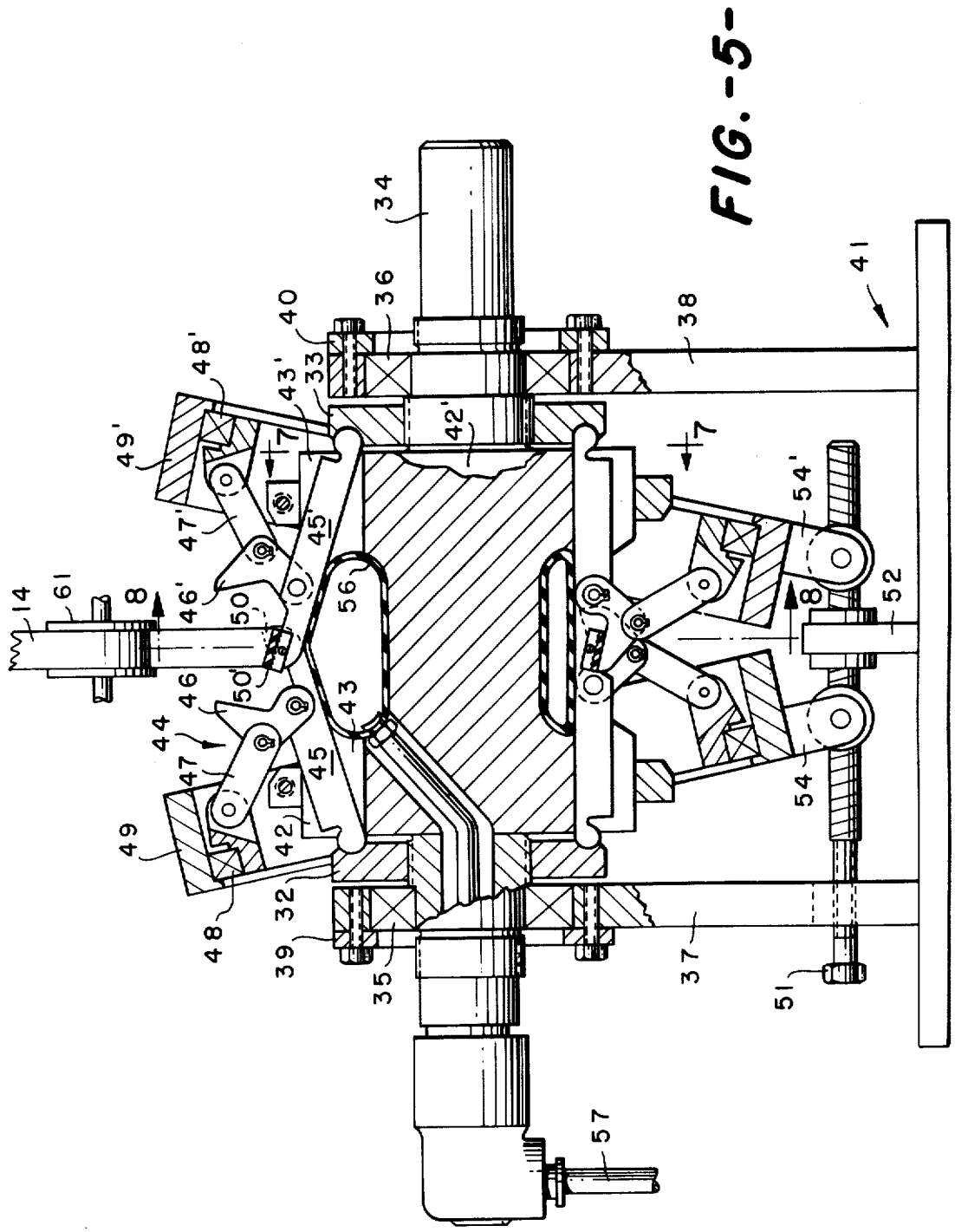

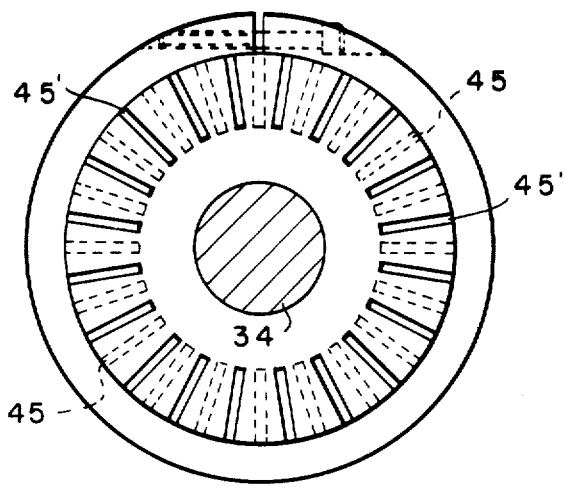
FIG.-7-
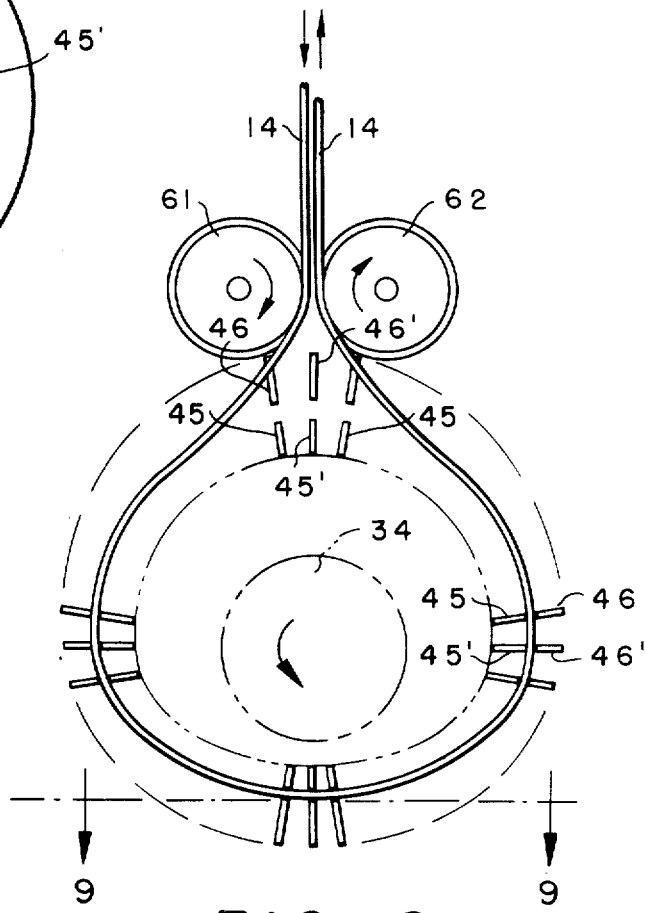
FIG.-8-
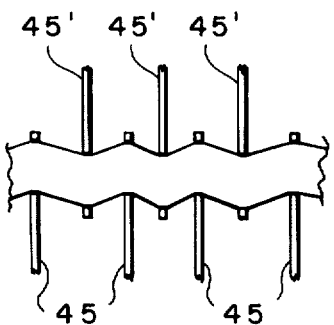
FIG.-9-

ENDLESS REINFORCEMENT

This is a division of application Ser. No. 432,162, filed Jan 10, 1974, now U.S. Pat. No. 4,002,789.

The tire industry has shown considerable interest in tire constructions which include an annular reinforcement or belt about the periphery of the tire between the carcass and tread portions thereof. Such belted tires have better road stability and longer tread life both in radial ply and bias ply carcass constructions.

The annular reinforcements are conventionally formed of cord or wire coated with or embedded in a suitable insulating material such as rubber or other material which is compatible with and has an adhesive affinity to the rubber of the tire. The cord usually is disposed in a pattern in which portions thereof extend at an angle to the longitudinal axis of the reinforcement. One such construction utilizes bias cut woven fabric which has been calendered with a layer of unvulcanized rubber. Also, it has been proposed to form reinforcements by winding one or more cords or strips onto a rotating drum while employing a reciprocating guide to lay the cord or strip in a generally zigzag pattern thereon. Examples of such belts are disclosed in U.S. Pat. Nos. 2,982,327; 3,589,426; 3,720,569; 3,720,570; and 3,729,365.

One of the considerations in the design of a tire reinforcement is the achievement of a tire which has a combination of long life and good ride aesthetics, that is, a tire which will provide a high level of performance together with low road noise level and a smooth ride. This combination of characteristics is difficult to achieve. When relatively thick reinforcements are utilized in tires, long tire life generally results but, with such thick reinforcements, the ride aesthetic may deteriorate. Conversely, the ride aesthetics generally are improved with thin reinforcements but the life of the tire may be adversely affected. Thus, it would be desirable to provide a thin reinforcement which does not adversely affect the life of the tire.

The present invention provides a novel endless reinforcement which has good ride characteristics with extended tire life. The reinforcement provides a high level of performance characteristics together with low road noise level and good vehicle handling and ride characteristics. Furthermore, the present invention provides a novel apparatus for forming the unitary strip employed in the production of the novel reinforcement.

The advantages and benefits of the invention will be apparent from the following detailed description of the drawings in which:

FIG. 1 is a fragmentary schematic view including an endless reinforcement of the invention;

FIG. 2 is an enlarged fragmentary schematic view of a portion of a unitary strip of the reinforcement shown in FIG. 1;

FIG. 3 is a schematic illustration of one form of apparatus for forming an endless reinforcement of the invention;

FIG. 4 is side elevation of one form of apparatus of the invention for forming a unitary strip;

FIG. 5 is a sectional view taken along line 5—5 of FIG. 4;

FIG. 6 is a sectional view along line 6—6 of FIG. 4;

FIG. 7 is a sectional view along line 7—7 of FIG. 5;

FIG. 8 is a schematic sectional view taken along line 8—8 of FIG. 5; and

FIG. 9 is a fragmentary sectional view taken along line 9—9 of FIG. 8.

As shown in FIG. 1, a tire having a endless reinforcement of the invention includes a reinforcement 11 disposed between tread 12 and carcass plies 13. The endless reinforcement is formed from a unitary strip 14 which includes a plurality of reinforcement continuous filaments 16 surrounded and separated by a plastic material 17 such as rubber. The filaments are in a continuous undulating relationship throughout the length of the strip. The undulations may be of a saw-tooth configuration as shown in the drawings or the undulations may be rounded or flattened at their extremities.

The reinforcing continuous filaments employed in the formation of the endless reinforcement may be any of the conventional tire cord materials such as ployester, nylon, rayon, cotton, metal wire and similar type materials which may be formed into a unitary strip with a continuous undulating relationship between the filaments. The strip advantageously is formed by passing a plurality of the reinforcing cords in the desired spaced relationship through an extruder to extrude the rubber, plastic or similar material around and over the cords and form a unitary structure. The width of the strip may vary over a considerable range and generally is between about ¼ and 2 inches in width. The particular width will depend upon the size of the reinforcement and the pattern desired. The spacing of the cords in the strip is generally about 10 to 50 cords per inch without any significant cord to cord contact occuring in the reinforcement.

FIG. 3 shows one form of apparatus for forming an endless reinforcement of the invention. The apparatus includes a rotatable winding drum 20 having a generally cylindrical outer surface 21 providing a support surface of cord strips 22 and 23 to be positioned thereon. Drum 11 is driven by suitable drive means 24. Associated with drum surface 12 are rolls 25 and 26 and guides 28 and 29 mounted for reciprocation transversely of the rotation of drum 20. Guides 28 and 29 are interconnected by a cable and pulley arrangement 30 to provide coordinated movement of the guides.

The strip is positioned across the width of the reinforcement from one side to the other at an angle to the edges. The angle of the strip will depend upon whether the reinforcement is expanded after it is incorporated with the carcass. With reinforcements which are applied to a tire carcass after substantial expansion has taken place, the angle of the strip is generally in the range of 5° to 35°. At the edges of the reinforcement the strip is folded back on itself or turned about an axis substantially perpendicular to the major plane of the strip.

With certain reinforcement designs, it may be desirable to form the reinforcement from more than one strip. This facilitates the production of a reinforcement in a shorter period of time and may produce a pattern having particular characteristics such as a high degree of symmetry. In this case the unitary strips are positioned in substantially mirror image disposition with respect to a plane circumferentially bisecting the reinforcement.

One form of apparatus for forming the undulations in the unitary strip employed in the production of the endless reinforcement of the invention is shown in FIGS. 4–9 of the drawings. As shown in FIG. 5, thrust collars 32 and 33 are threaded onto a shaft 34 supported on bearings 35 and 36 which are carried in support members 37 and 38 of frame 41. The bearings 35 and 36 are held in place by retainer rings 39 and 40, respectively, which are bolted to the support members 37 and 38. The central portion of the shaft 34 has enlarged flange-like sections 42 an 42' inboard of the thrust collars 32 and 33, respectively. The enlarged flange sections 42 and 42' each have a plurality of radial slots 43 (FIG. 4) so arranged that individual slots in one end of flange section are aligned midway between individual slots in the opposite end.

A multiplicity of strip gripper assemblies 44 (FIG. 5) are disposed in the slots 43 and 43' of the respective left and right flanges in alternating interdigitating relationship. Each gripper includes an arm 45 and a pivoting jaw 46. Jaw 46 is pivotally connected through a link 47 to a cam ring bearing 48 which is carried by canted ring support 49. At the end of arm 45 adjacent jaw 46 is mounted a toothed gripper pad 50. In the same way, arm 45' with toothed gripper pad 50' has a jaw portion 46' which is connected to a cam ring bearing 48' through a link 47'. Cam ring bearing 48' is disposed within canted ring support 49'. The canted angle of the ring supports 49 and 49' may be adjusted by rotation of right and left hand threaded screw 51 which is carried by thrust bearing sleeve 52 affixed to frame 41. Screw 51 threadedly engages extensions 54 and 54' attached to the lower portion of ring supports 49 and 49', respectively. Grippers 44 are biased radially away from the shaft 34 by a gas bladder 56 which is disposed between the flange sections 42 and 42' and the under side of the grippers 44. The cavity of bladder 56 is connected to a gas source 57.

In the operation of the apparatus shown in FIGS. 4-9, a strip 14 is guided by idler roll 61 into engagement with toothed gripper pads 50 and 50' at the ends of arms 45 and 45' as shown in FIG. 5. Thereafter, rotation of shaft 34 causes slots 43 and 43' which engage arms 45 and 45' which engage arms 45 and 45' to rotate therewith. At the same time, thrust collars 32 and 33 adjustably positioned on shaft 34 provide a fulcrum position and thrust to arms 45 and 45'. As the arms 45 and 45' rotate with shaft toward 90°, the jaws 46 and 46' attached thereto are moved to a closed position and bear against the top of the strip so that the strip is gripped between jaw 46 and pad 50 and between jaw 46' and pad 50' in an alternating arrangement. In the same way, as each gripper assembly is rotated by shaft 34 toward 90°, the respective jaw is closed.

Further rotation of the gripper assemblies with shaft 34 into the 90-180° quadrant causes the closed assemblies with the unitary strip clamped therebetween to exert greater force against the bladder 56 and override the counter force thereof. This is accomplished by link 47 moving in synchronism with shaft 34 and gaining lateral movement from the inner race of canted ring bearing 48. The movement of link 47 simultaneously increases the degree of interdigitation of the gripper assemblies producing lateral undulations in the strip. At the same time, the distance between the respective arms 45 and 45' and their gripper assemblies decreases as shown in FIG. 8 to compensate for the shortening of the strip which results when the interdigitating grippers produce the undulations in the strip. Further rotation of the gripper assemblies toward 270° reverses the radial action of each gripper. As the gripper assemblies are advanced, the cam ring bearings 48 and 48' cause the degree of interdigitation thereof to reduce allowing the gripper assemblies to be moved away from the shaft 34 by the force of the bladder 56. Additional rotation toward 360° causes the links 47 and 47' to open jaws 46 and 46', respectively, releasing the undulated strip and allowing it to advance by the action of roll 62 away from the apparatus.

Since the apparatus of the invention includes a multiplicity of gripper assemblies arranged in a continuous rotary configuration, the apparatus may be operated smoothly at a rapid rate. Moreover, the strip produced is highly uniform with a great number of lateral undulations and preferably at least one undulation per 2 inches.

When the reinforcing filaments in the strip are steel or metal wires, the wires will tend to spring back from their maximum deflection. This may be compensated by designing the maximum deflection to provide the desired deflection after springback. With such metal wires, a degree of deflection is desired to provide a substantial permanent crimp in the wires.

The resultant strip with the lateral undulations therein generally has dual moduli, i.e. low at low tensions and high at high tensions. This permits the strips and the reinforcements made therefrom to operate successfully during the life of the tire when it is subject to changes in stresses as it passes during wheel rotation through the footprint area, that is, contact with the road surface. In the footprint area, compression of the filaments may take place with the result that the strip with the undulations permits compression without buckling filaments due to column action.

The above description and the accompanying drawings show that the present invention provides a novel endless reinforcement formed from a unitary strip in which a multiplicity of continuous filaments are in contiguous undulating relationship. Tires including such novel endless reinforcements have low road noise and good vehicle handling and ride characteristics while providing extended tire life. Furthermore, the invention provides a new apparatus for forming unitary strips for the production of such reinforcements. The apparatus provides a high rate of production of such unitary strips over extended periods of time.

It will be apparent that various modifications and changes in the product and apparatus described in detail and shown in the drawings can be made within the scope of the invention. For example, the undulations may take a variety of different forms from the saw-tooth configuration shown. Also, the arrangement and linkages employed in the strip grippers may be modified in the apparatus provided they function in a similar way. Therefore, while the foregoing description and drawings are intended to illustrate the invention, the scope of the invention is to be limited only by the following claims.

That which is claimed is:

1. Apparatus for forming a unitary strip including a multiplicity of continuous filaments disposed in a contiguous lateral undulating relationship throughout the length of strip, said apparatus including interdigitating gripper means arranged in an oval path, wherein each gripper means includes a clamping jaw member movable from an opened to a closed position, means for advancing said gripper means around said oval path, and means for increasing the degree of interdigitation of said gripper means during a portion of their advancement around said oval path.

2. Apparatus according to claim 1 wherein said gripper means include toggle linkages.

3. Apparatus according to claim 1 wherein said gripper means are open during that portion of the advancement thereof remote from that in which the interdigitating relationship is increased.

4. Apparatus according to claim 3 wherein said apparatus includes means for biasing said gripper means in said open position.

5. Apparatus according to claim 4 wherein said biasing means includes a gas bladder.

6. Apparatus according to claim 1 wherein said apparatus includes means for decreasing the spacing between said gripper means during the portion of the advancement thereof in which the interdigitation is increased.

7. Apparatus according to claim 1 wherein said apparatus includes means for adjusting the increase in the degree of interdigitation of said gripper means.

8. Apparatus according to claim 1 wherein adjacent gripper means are spaced to provide at least one gripper means per 2 inches.

9. Apparatus for forming a unitary strip including a multiplicity of continuous filaments disposed in a contiguous lateral undulating relationship throughout the length of the strip, said apparatus including:
   a frame;
   a shaft mounted for rotation on said frame;
   a plurality of interdigitating gripper means mounted on said shaft, wherein each said gripper means includes a clamping jaw member movable from an open to a closed position;
   means for rotating said shaft;
   means for increasing the degree of interdigitation of said gripper means during a portion of the rotation of said shaft; and
   means for closing each said jaw member during the portion of the rotation wherein the degree of interdigitation of the gripper means is increased.

10. Apparatus according to claim 9 wherein the means for closing said jaw member comprises a pair of canted cam members mounted on said frame and substantially encompassing said shaft, said cam members being canted towards each other so as to form a v shape, and wherein each gripper means includes:
    an arm pivotably joined to said shaft upon which said jaw member is pivotably mounted; and
    a link, one end of which is pivotably connected to said jaw, the other end of which follows said cam as said shaft is rotated.

11. The apparatus of claim 10 further comprising means for biasing said gripper means in the open position.

12. The apparatus of claim 11 wherein said means for biasing said gripper means in the open position includes a gas bladder.

13. The apparatus of claim 12 further comprising means for adjusting the degree to which said cam members are canted.

14. The apparatus of claim 13 further comprising a plurality of toothed gripper pads, one mounted on each arm.

* * * * *